H. C. MOORE.
RESILIENT WHEEL.
APPLICATION FILED MAY 11, 1912.

1,049,129.

Patented Dec. 31, 1912.

Witnesses
R. M. Baconan
J. H. Shelly.

Inventor
Henry C. Moore.
by John H. Holt
his Attorney

UNITED STATES PATENT OFFICE.

HENRY C. MOORE, OF CLEBURNE, TEXAS.

RESILIENT WHEEL.

1,049,129.      Specification of Letters Patent.      Patented Dec. 31, 1912.

Application filed May 11, 1912.  Serial No. 696,774.

*To all whom it may concern:*

Be it known that I, HENRY C. MOORE, a citizen of the United States, residing at Cleburne, in the county of Johnson and State of Texas, have invented certain new and useful Improvements in Resilient Wheels, of which the following is a specification.

This invention relates more especially to improvements in resilient wheels for automobiles, motorcycles, bicycles and other vehicles, the principal object of the invention being to provide a wheel which shall be shock-absorbing independently of the resiliency of the tire. I am aware that various attempts have been made to supply a wheel of this class for the purpose of supplanting pneumatic tires, but so far as I am aware these have not proven practicable.

My invention seeks to provide a wheel of this class which will meet the practical requirements of giving a desired amount of resiliency and at the same time stand the various strains to which such wheels are subjected, especially on automobiles.

Figure 1:
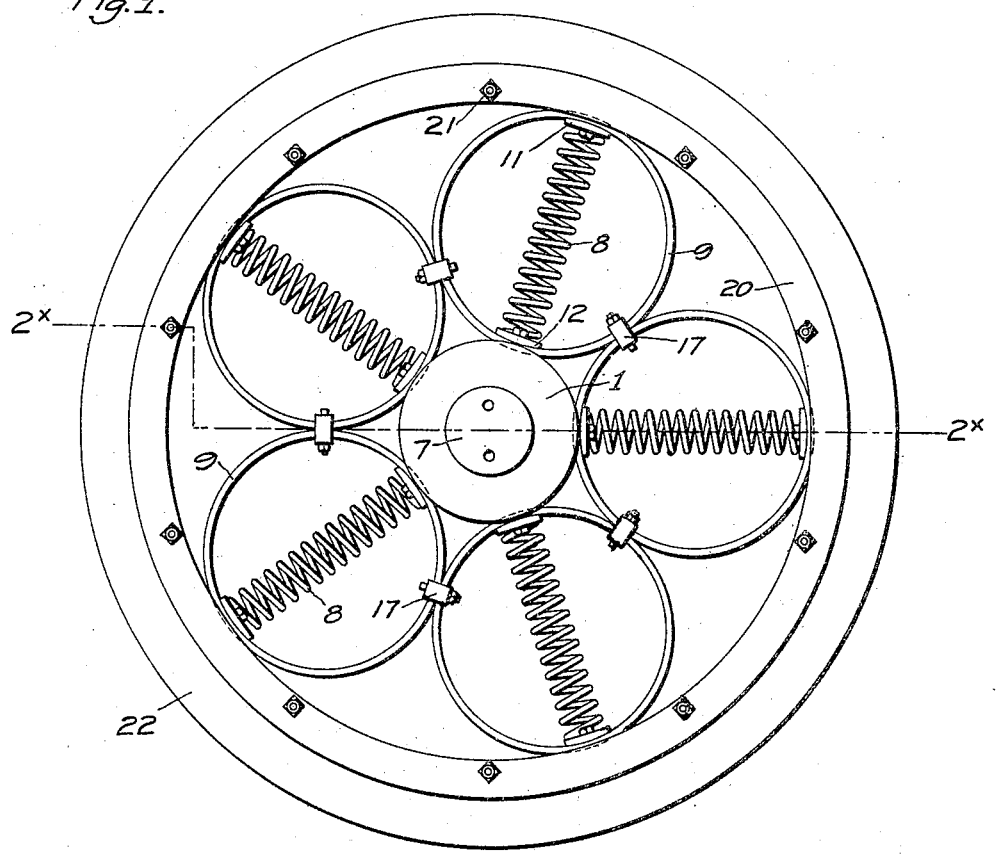
Figure 2:
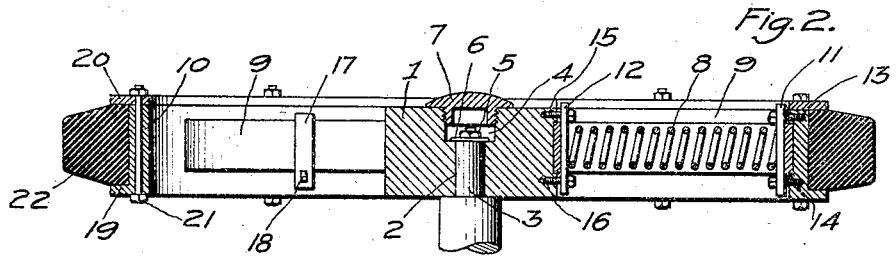
Figures 3, 4:
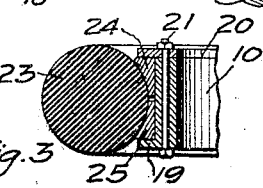

In order to more fully describe my said invention, reference will be had to the accompanying drawings, wherein;

Figure 1, represents in side elevation, a wheel embodying one form of my said invention; Fig. 2, a sectional elevation on line $2^x$—$2^x$, Fig. 1; Fig. 3, a detail of a modification of said wheel, and Fig. 4, a detail side elevation of one of the spring holding clamps.

Referring to the accompanying drawings, 1 represents the wheel hub which consists preferably of a cylindrical piece of iron having a central bore 2 to receive the axle spindle 3. The outer end of said spindle extends into a countersink 4 in the hub where, by means of a nut 5 and washer 6 the wheel is held on the spindle. This countersunk portion of the hub is closed by means of a screw cap 7.

I do not here make claim to any special way of mounting the hub on the spindle, but have merely shown one way of doing this.

The usual spokes are replaced in this wheel by a series of coil springs 8, carried within hoop springs 9, the latter being countersunk in the hub 1 and rim 10, as shown. The coil springs 8 are preferably forged at each end to plates 11 and 12 which extend across the hoop springs and which are bolted to the rim and hub respectively by bolts 13, 14 and 15, 16, on each side of the hoop springs. The several hoop springs are held firmly together to prevent rattling, by means of clamps 17, consisting each of a metal strap provided with a taper bolt 18.

One of the chief weaknesses of wheels of this class has been that they have not been built with a view to standing the many strains to which wheels of this kind are subjected, particularly in the case of automobiles, the most dangerous of such strains being that which acts transversely of the wheel and tends to "dish" it. My invention provides especially for this in making the hoop springs relatively very broad, covering the greater portion of the width of the rim, and countersinking these hoops in both the hub and rim. Again, the welding of the coil springs in position, produces an exceptionally strong and simple structure. Also, the coil springs are so arranged that in case of a great shock, the individual coils will come into engagement with each other and thereby form a solid chock which will prevent the hoop springs breaking. The rim in the case shown, consists of a preferably metal hoop 10 having an integral flange 19 on one side, and a detachable flange 20 on the other side, the latter flange consisting of a flat metal ring secured to the body of the rim by means of bolts 21. This arrangement is particularly adapted for solid tires 22 of the flat base type. If the tire has a round base as in the case of a tire such as 23, Fig. 3, inserts 24 and 25 may be employed to form a concave seat for the tire. These inserts consist each of a ring, shaped in cross section as shown, and are adapted to be slipped on or off the wheel rim.

If desired, pneumatic tires may be used on my wheel, but its chief use will be with solid tires, the principal object of the invention being to supplant the expensive pneumatic tire by an arrangement which will give the desired resiliency with a solid tire.

It being understood that the invention as here described is susceptible to structural modifications without departing from the spirit thereof, what I claim is:—

1. A resilient wheel, comprising a rim, a hub, a plurality of hoop springs located between and countersunk in the hub and rim, a plurality of elongated coil springs, one for each of said hoop springs, arranged radially about said hub and extending diametrically across said hoop springs, a plate rigidly secured to each end of each of said coil springs and extending transversely across the said hoop springs for holding said hoop springs in rigid connection with said rim and hub, and means for attaching said plates rigidly to the said hub and rim on each side of said hoop springs, the said hoop springs being of such width that they extend over a greater portion of the width of the rim.

2. A resilient wheel, comprising a rim, a hub, a plurality of hoop springs located between the said rim and hub and tangent to each other, a plurality of elongated coil springs, one for each of said hoop springs, arranged radially about said hub, and extending diametrically across said hoop springs, and clamping means secured to said coil springs and holding said hoop springs in rigid connection with said rim and hub.

3. A resilient wheel, comprising a rim, a hub, a plurality of hoop springs located between and countersunk in the hub and rim, a plurality of elongated coil springs, one for each of said hoop springs, arranged radially about said hub and extending diametrically across said hoop springs, a plate rigidly secured to each end of each of said coil springs and extending transversely across the said hoop springs for holding said hoop springs in rigid connection with said hub and rim, and means for attaching said plates rigidly to the said hub and rim.

In testimony whereof I affix my signature in presence of two witnesses.

HENRY C. MOORE.

Witnesses:
M. RAMSEY, Jr.,
LOUISE SHERRILL.

---

Copies of this patent may be obtained for five cents each, by addressing the "Commissioner of Patents, Washington, D. C."